Oct. 13, 1942.                B. BURNHAM                 2,298,344
                       PHOTOGRAPHIC PRINTING APPARATUS
                            Filed March 22, 1941
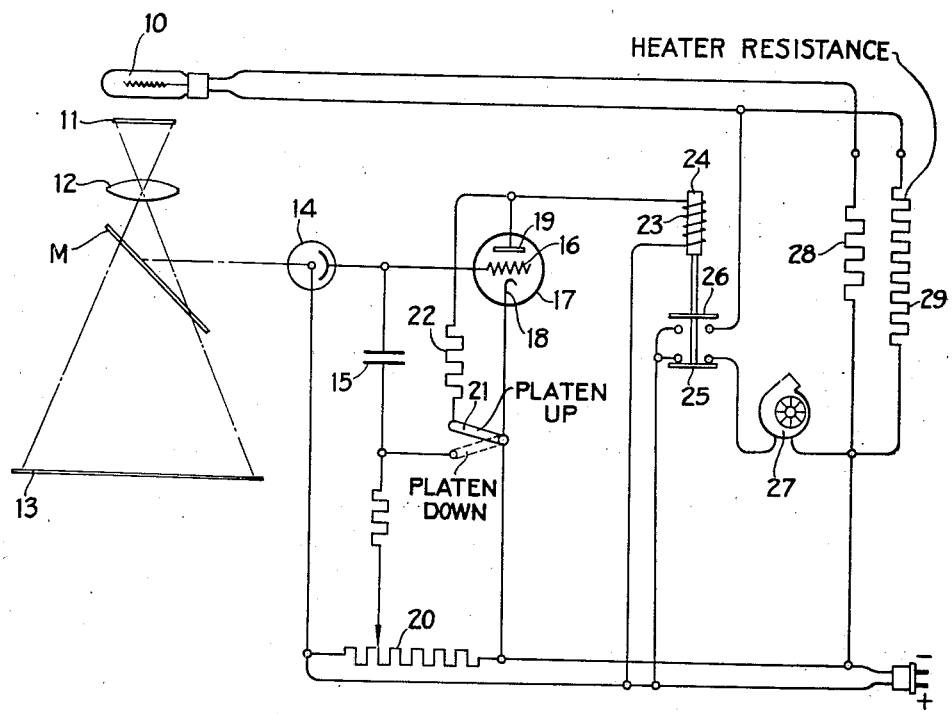
BRADSHAW BURNHAM
*INVENTOR*
BY *Newton M. Perrins*
   *Rolla N. Carter*
*ATTORNEYS*

Patented Oct. 13, 1942

2,298,344

UNITED STATES PATENT OFFICE 2,298,344

PHOTOGRAPHIC PRINTING APPARATUS

Bradshaw Burnham, Rochester, N. Y., assignor to Eastman Kodak Company, Rochester, N. Y., a corporation of New Jersey Application March 22, 1941, Serial No. 384,723

6 Claims. (Cl. 88—24)

The present invention relates to photographic printing apparatus and, more particularly, to such apparatus having means for controlling automatically the exposure interval in accordance with the average transmission of a record being printed.

As a general statement, it may be said that in printing different records different time intervals are provided to the end that the sensitive material upon which the print is made will in each case receive the same exposure. The exposure level found to be satisfactory will, of course, differ for different sensitive materials but means are well known for compensating for sensitivity factors and therefore will be ignored in describing the present invention.

While the above general statement holds for the average run of records to be printed, it is known that prints made from very thin and very dense records, usually negatives, are incorrectly exposed when the time interval is controlled automatically as a fixed function of the intensity of exposure. Such a control means does not take into account the exposing light emitted by an incandescent lamp after its circuit is broken and which is appreciable when very short exposures are called for nor the reciprocity failure involved in long exposures.

It is an object of the present invention to compensate for these shortcomings by providing means for suitably varying during an exposure the ratio between the exposing light and the light affecting the control system so that, when the control system has integrated or otherwise measured the light quantum found correct for properly exposing average prints, the actual printing exposure will vary therefrom by an amount sufficient to take into account the afterglow for very short exposures and the reciprocity failure for very long exposures.

Other objects and advantages of the invention will appear from the following description when read in connection with the accompanying drawing, the single figure of which shows diagrammatically a printer having a circuit arrangement incorporating the preferred embodiment of the invention.

In the drawing, a printing lamp 10 is positioned to illuminate a record 11, usually a photographic negative, which is imaged by a lens 12 onto a sensitive layer 13 to be printed. A predetermined portion of the light transmitted by the record 11 is directed to a light-sensitive cell 14 by a semi-transparent mirror M as is well known. The cell 14 is arranged in the discharge path of a condenser 15 which is employed in a well-known manner to control a printing interval by its variation of the potential on the control electrode 16 of a suitable tube 17 having a cathode 18 and an anode or plate 19.

The present circuit is designed for operation on direct current and, when plugged into a suitable direct current source and with the circuit in the condition shown in the drawing, the condenser 15 is charged by the grid current of tube 17 to a value dependent upon the adjustment of a potentiometer 20 and which determines the exposure level to be given by the exposure control system. While the condenser 15 is thus maintained at a predetermined charge, a switch 21, which is preferably adapted to be controlled by movement of the platen (not shown), connects a resistance 22 across the cathode and plate of the tube 17 to insure a current flow through a coil 23 arranged in the output circuit of the tube 17. This coil 23, when energized, attracts its armature 24 to hold in circuit closing position a switch 25, and when the coil 23 is not energized the armature 24 is released to open switch 25 and close switch 26. Switch 25 closes the circuit through a fan 27 positioned to blow air onto a resistance 28 for cooling this resistance 28 whenever the switch 25 is closed and, therefore, whenever a printing exposure is not taking place. When the switch 26 is closed, it closes a circuit through the lamp 10 and the resistance 28 in series and also energizes a heater resistance 29 which is preferably connected across the line in parallel with the lamp 10 and the resistance 28. For the reason hereinafter appearing, the resistance 29 is positioned so that it will heat the resistance 28 to increase its temperature at a more rapid rate than it would increase by reason of the current flowing through the resistance 28.

When an exposure is started, as by pressing down the platen, the switch 21 is moved to the position shown in broken lines to connect the condenser 15 directly across the cathode 18 and the grid 16 of the tube 17. This applies the potential of the condenser 15 to the grid 16 which blocks the tube 17 so that no plate current flows and the coil 23 is deenergized, permitting the switch 25 to open and the switch 26 to close. When switch 26 closes, the lamp 10 is energized to start an exposure and to render the cell 14 conductive so that the condenser 15 starts to discharge at a rate dependent upon the amount of light falling on the cell 14. After a time interval, dependent upon the activation of the cell 14, the charge on the condenser 15 will be reduced to a point where the potential on the grid 16 permits plate current to flow through the coil 23, thereby opening switch 26 to discontinue the exposure.

If the cell 14 had exactly the same spectral sensitivity as the photographic material 13, the time interval for every record 11 would be such that the lamp 10 was turned off after a predetermined quantum of light had fallen on the sensitive material 13. However, the spectral sensitivity of the cell 14 differs from that of the sensitive material 13 by being sensitive to wave lengths longer than the wave lengths to which the material 13 is sensitive. This condition is taken advantage of by the present invention to compensate for incorrect exposures which would otherwise occur due to afterglow of the lamp 10 when short exposures are involved and due to reciprocity failure when long exposures are involved.

When the record 11 is very thin and, therefore, requires a very short exposure, the resistance 28 in series with the lamp 10 increases the time required for the lamp 10 to reach temperature equilibrium and, therefore, increases the time required for the lamp 10 to reach its full brilliance. It is, of course, obvious that during this time interval, while the lamp 10 is increasing in brilliance, the lamp 10 is emitting a greater proportion of the longer wave lengths to which the cell 14 is sensitive than it is the shorter wave lengths to which the material 13 is sensitive. Thus, the cell 14 and its associated control circuit measures the exposure level in terms of the light to which it is sensitive and, thus, due to the action of the resistance 28, the switch 26 is opened to turn off the printing lamp 10 before the material 13 has received the desired quantum of actinic light. This deficit of actinic light is, however, supplied by the afterglow which takes place while the lamp 10 is cooling off after its circuit has been opened.

When very long exposures are involved, as when the record 11 is very dense, experience has shown that for satisfactory results the sensitive material 13 must receive a greater quantum of light due to the failure of the reciprocity law. The present invention increases the quantum of light received by the sensitive material 13 as the exposure interval increases by using for the resistance 28 a material, such as manganin, having a negative coefficient of resistance so that, as the resistance 28 heats up, its resistance gradually decreases which brings about an increase in the current through the lamp 10 and a corresponding increase in the ratio in the current through the lamp 10 and a corresponding increase in the ratio between the light to which the material 13 is sensitive and the light to which the cell 14 is sensitive. Thus, while the cell 14 and its control circuit acts to terminate the exposure when it has received a predetermined quantum of measuring light, the quantum of actinic light received by the material 13 has been increased by reason of the increased brilliancy of the lamp 10.

When exposures are made in rapid succession, it is desirable to have each exposure start with the resistance 28 in substantially the same condition and, to bring this about, the blower 27 is arranged to supply cooling air for the resistance 28 at all times when an exposure is not being made. Also, in some instances, it is desirable to accelerate the change in resistance of the resistor 28 and this may be accomplished by means of the heater resistance 29 which is arranged to be energized only during a printing interval.

It is believed to be evident from the above description that the objects of the present invention have been accomplished without complicating the control circuit, since the control circuit is unaware that any compensation has taken place. This will be obvious from the fact that the control circuit in every instance functions in exactly the same way to terminate the exposure when the cell 14 has received a fixed quantum of measuring light. The means provided by the invention for bringing about the desired changes in the quantum of printing light, as required for very short and very long exposures, are entirely separate from the control circuit and function automatically in a very simple manner.

While the invention has been described in connection with a specific circuit arrangement designed to operate on direct current, it will be obvious to one skilled in the art that the invention may be applied to other circuit arrangements and may readily be adapted for operation from an alternating current source of supply.

What I claim is new and desire to secure by Letters Patent of the United States is:

1. In a photographic printer in which an exposure interval is terminated under the control of a photoelectric system whose sensitivity includes wavelengths of light longer than the actinic wavelengths, an incandescent lamp, means for energizing the lamp to initiate an exposure interval, and means in circuit with the lamp for limiting the initial current surge so as to prolong the time required for the lamp to come to equilibrium temperature, whereby the photoelectric system is energized proportionally greater than the printing material.

2. In a photographic printer in which an exposure interval is terminated under the control of a photoelectric system whose sensitivity includes wavelengths of light longer than the actinic wavelengths, an incandescent lamp, means for energizing the lamp to initiate an exposure interval, and a resistor in the lamp circuit for prolonging the time required for the lamp to reach temperature equilibrium, whereby thin negatives are relatively underexposed, said resistor having a predetermined temperature coefficient of resistivity for gradually varying the energization of the lamp after the lamp reaches initial temperature equilibrium, whereby in the long exposure region the print density negative density relationship becomes non-linear in a manner predetermined by said resistor.

3. The printer defined in claim 2 in which a cooling means for the resistor is actuated upon the termination of an exposure interval.

4. The printer defined in claim 2 in which a heating means for the resistor is energized upon the initiation of an exposure interval.

5. In apparatus for the automatic control of exposure in the photographic printing of records of varying densities and including exposure terminating means responsive to the quantum of measuring light transmitted by the record, a lamp adapted to emit printing light and measuring light in a ratio dependent upon the energization of the lamp, and means for progressively varying the energization of the lamp through an exposure interval.

6. In apparatus for the automatic control of exposure in the photographic printing of records of varying densities and including exposure timing means responsive to the quantum of measuring light transmitted by the record, an electric lamp adapted to emit printing light and measuring light in a ratio dependent upon and increasing with the energization of the lamp, and a resistance in series with the lamp, said resistance having a negative coefficient of resistivity, whereby when the lamp is energized to start a printing exposure it will come to full normal brilliance and then increase in brilliance as said resistance is heated by passage of the lamp current, thereby increasing the printing light relatively to the measuring light.

BRADSHAW BURNHAM.